(12) United States Patent
Simon et al.

(10) Patent No.: US 9,151,042 B2
(45) Date of Patent: Oct. 6, 2015

(54) FIRE-PREVENTION SLEEVE, USE OF THE FIRE-PREVENTION SLEEVE, METHOD FOR INSTALLING A FIRE-PREVENTION SLEEVE, AND CEILING PASSAGE

(75) Inventors: Sebastian Simon, Buchloe Lindenberg (DE); Christian Forg, Lamerdingen (DE); Mario Paetow, Igling (DE)

(73) Assignee: HILTI AKTIENGESELLSCHAFT (LI)

( * ) Notice: Subject to any disclaimer, the term of this patent is extended or adjusted under 35 U.S.C. 154(b) by 29 days.

(21) Appl. No.: 13/618,386

(22) Filed: Sep. 14, 2012

(65) Prior Publication Data
US 2013/0091789 A1    Apr. 18, 2013

(30) Foreign Application Priority Data
Sep. 16, 2011    (DE) .......................... 10 2011 082 833

(51) Int. Cl.
| | |
|---|---|
| *E04B 1/94* | (2006.01) |
| *A62C 2/06* | (2006.01) |
| *H02G 3/22* | (2006.01) |
| *E04B 9/00* | (2006.01) |
| *F16L 5/04* | (2006.01) |

(52) U.S. Cl.
CPC ............... *E04B 1/944* (2013.01); *A62C 2/065* (2013.01); *E04B 1/947* (2013.01); *E04B 9/00* (2013.01); *F16L 5/04* (2013.01); *H02G 3/22* (2013.01); *Y10T 428/13* (2015.01)

(58) Field of Classification Search
CPC ............. F16L 5/04; F16L 5/00; F16L 41/088; E04B 1/94; E04B 1/941; E04B 2/7411; E04B 1/947; E04B 1/948; E04C 2/521; E04C 2/52; E04C 1/40; A62C 2/065; A62C 2/06; B32B 15/04; H02G 3/22; H02G 3/0412
USPC ............................. 52/220.1, 220.8, 317, 232
See application file for complete search history.

(56) References Cited

U.S. PATENT DOCUMENTS

| | | | | | |
|---|---|---|---|---|---|
| 2,342,458 | A | * | 2/1944 | Davies .......................... | 277/530 |
| 2,434,484 | A | * | 1/1948 | Chambers, Jr. ................ | 277/553 |
| 3,476,411 | A | * | 11/1969 | Herbert et al. ................ | 285/192 |
| 3,995,102 | A | * | 11/1976 | Kohaut ......................... | 174/483 |

(Continued)

FOREIGN PATENT DOCUMENTS

| | | |
|---|---|---|
| DE | 19852120 A1 | 3/2000 |
| EP | 1362961 A1 | 11/2003 |

(Continued)

OTHER PUBLICATIONS

EP Communication, Sep. 5, 2012 in Application No. EP12181471.9.

*Primary Examiner* — Joshua J Michener
*Assistant Examiner* — Matthew Gitlin
(74) *Attorney, Agent, or Firm* — McAndrews, Held & Malloy, Ltd.

(57) ABSTRACT

In a ceiling passage with an opening through which a pipe extends in the vertical direction, the pipe being surrounded by a fire-prevention sleeve, the fire-prevention sleeve includes, for example, fire-prevention additives embodied in a rectangular strip. A plurality of notches are provided along only one longitudinal side of the rectangular strip. The plurality of notches are used to form flaps at a bottom edge of the rectangular strip and are bent backwards. The flaps are supported at an inner wall of the ceiling passage near a bottom of the ceiling passage.

18 Claims, 3 Drawing Sheets

(56) References Cited

U.S. PATENT DOCUMENTS

| | | | | |
|---|---|---|---|---|
| 4,199,157 A * | 4/1980 | Skinner et al. | | 277/606 |
| 4,215,868 A | 8/1980 | Burdick et al. | | |
| 4,323,724 A * | 4/1982 | Shine | | 174/483 |
| 4,364,210 A * | 12/1982 | Fleming et al. | | 52/220.8 |
| 4,559,745 A * | 12/1985 | Wexler | | 52/1 |
| 4,630,415 A * | 12/1986 | Attwell | | 52/321 |
| 4,848,043 A * | 7/1989 | Harbeke | | 52/1 |
| 4,888,925 A * | 12/1989 | Harbeke | | 52/232 |
| 4,951,442 A * | 8/1990 | Harbeke, Jr. | | 52/745.2 |
| 4,991,858 A * | 2/1991 | Abila et al. | | 277/606 |
| 5,058,341 A * | 10/1991 | Harbeke, Jr. | | 52/232 |
| 5,103,609 A * | 4/1992 | Thoreson et al. | | 52/232 |
| 5,155,957 A * | 10/1992 | Robertson et al. | | 52/232 |
| 5,326,609 A * | 7/1994 | Gohlke | | 428/76 |
| 5,498,466 A * | 3/1996 | Navarro et al. | | 428/408 |
| 5,586,739 A * | 12/1996 | Gantner et al. | | 248/74.1 |
| 5,634,304 A * | 6/1997 | Sakno | | 52/232 |
| 5,806,139 A * | 9/1998 | Anderson et al. | | 16/2.1 |
| 5,876,042 A * | 3/1999 | Graf et al. | | 277/627 |
| 5,885,912 A * | 3/1999 | Bumbarger | | 442/239 |
| 5,887,395 A * | 3/1999 | Navarro et al. | | 52/232 |
| 5,887,396 A * | 3/1999 | Thoreson | | 52/232 |
| 5,947,159 A * | 9/1999 | Takahashi | | 138/156 |
| 5,953,872 A * | 9/1999 | MacMillian et al. | | 52/220.8 |
| 5,974,750 A * | 11/1999 | Landin et al. | | 52/396.01 |
| 6,029,412 A * | 2/2000 | Gohlke | | 52/232 |
| 6,176,052 B1 * | 1/2001 | Takahashi | | 52/232 |
| 6,410,137 B1 * | 6/2002 | Bunyan | | 428/356 |
| 6,426,463 B2 * | 7/2002 | Munzenberger et al. | | 174/77 R |
| 6,470,635 B2 * | 10/2002 | Cornwall | | 52/220.8 |
| 6,725,615 B1 * | 4/2004 | Porter | | 52/232 |
| 6,862,852 B1 * | 3/2005 | Beele | | 52/220.8 |
| 7,568,314 B2 * | 8/2009 | Collins | | 52/60 |
| 8,024,900 B2 * | 9/2011 | Cordts | | 52/220.8 |
| 8,146,305 B2 * | 4/2012 | Cordts | | 52/220.8 |
| 8,336,832 B2 * | 12/2012 | van Walraven et al. | | 248/56 |
| 8,393,121 B2 * | 3/2013 | Beele | | 52/220.8 |
| 8,672,275 B2 * | 3/2014 | Van Walraven et al. | | 248/56 |
| 2003/0167712 A1 * | 9/2003 | Robertson | | 52/232 |
| 2006/0082137 A1 * | 4/2006 | Muenzenberger | | 285/124.5 |
| 2011/0180278 A1 * | 7/2011 | Magnay et al. | | 169/48 |
| 2012/0216791 A1 * | 8/2012 | Munzenberger | | 126/314 |

FOREIGN PATENT DOCUMENTS

| | | |
|---|---|---|
| EP | 1396675 A1 | 3/2004 |
| WO | 0068608 A1 | 11/2000 |

* cited by examiner

FIRE-PREVENTION SLEEVE, USE OF THE FIRE-PREVENTION SLEEVE, METHOD FOR INSTALLING A FIRE-PREVENTION SLEEVE, AND CEILING PASSAGE

CROSS-REFERENCE TO RELATED APPLICATIONS

The present application claims priority to German Patent Application No. DE 10 2011 082 833.8, filed Sep. 16, 2011, which is hereby incorporated by reference herein in its entirety.

BACKGROUND OF THE INVENTION

Some embodiments of the present invention relate to a fire-prevention sleeve and/or the use of the fire-prevention sleeve. Additionally, some embodiments of the present invention relate to a method for installing a fire-prevention sleeve in a ceiling passage.

BRIEF SUMMARY OF THE INVENTION

Some embodiments of the present invention provide a fire-prevention sleeve and/or the use of the fire-prevention sleeve. Additionally, some embodiments provide a method for installing a fire-prevention sleeve in a ceiling passage.

Some embodiments provide a fire-prevention sleeve. The fire-prevention sleeve can include, for example, fire-prevention additives embodied in a rectangular strip. A plurality of notches are provided along only one longitudinal side of the rectangular strip are used to form neighboring flaps.

Some embodiments provide that, in a ceiling passage with an opening through which a pipe extends in the vertical direction, the pipe being surrounded by a fire-prevention sleeve, the fire-prevention sleeve includes, for example, fire-prevention additives embodied in a rectangular strip. A plurality of notches are provided along only one longitudinal side of the rectangular strip. The plurality of notches are used to form flaps at a bottom edge of the rectangular strip and are bent backwards. The flaps are supported at an inner wall of the ceiling passage near a bottom of the ceiling passage.

Some embodiments provide a method for installing a fire-prevention sleeve in a ceiling passage of a ceiling in which a pipe is located. The method can include, for example, one or more of the following: arranging a fire-prevention around the pipe from above the ceiling; and forming flaps on an edge of fire-prevention sleeve facing the ceiling.

DETAILED DESCRIPTION OF THE INVENTION

Figure 1:
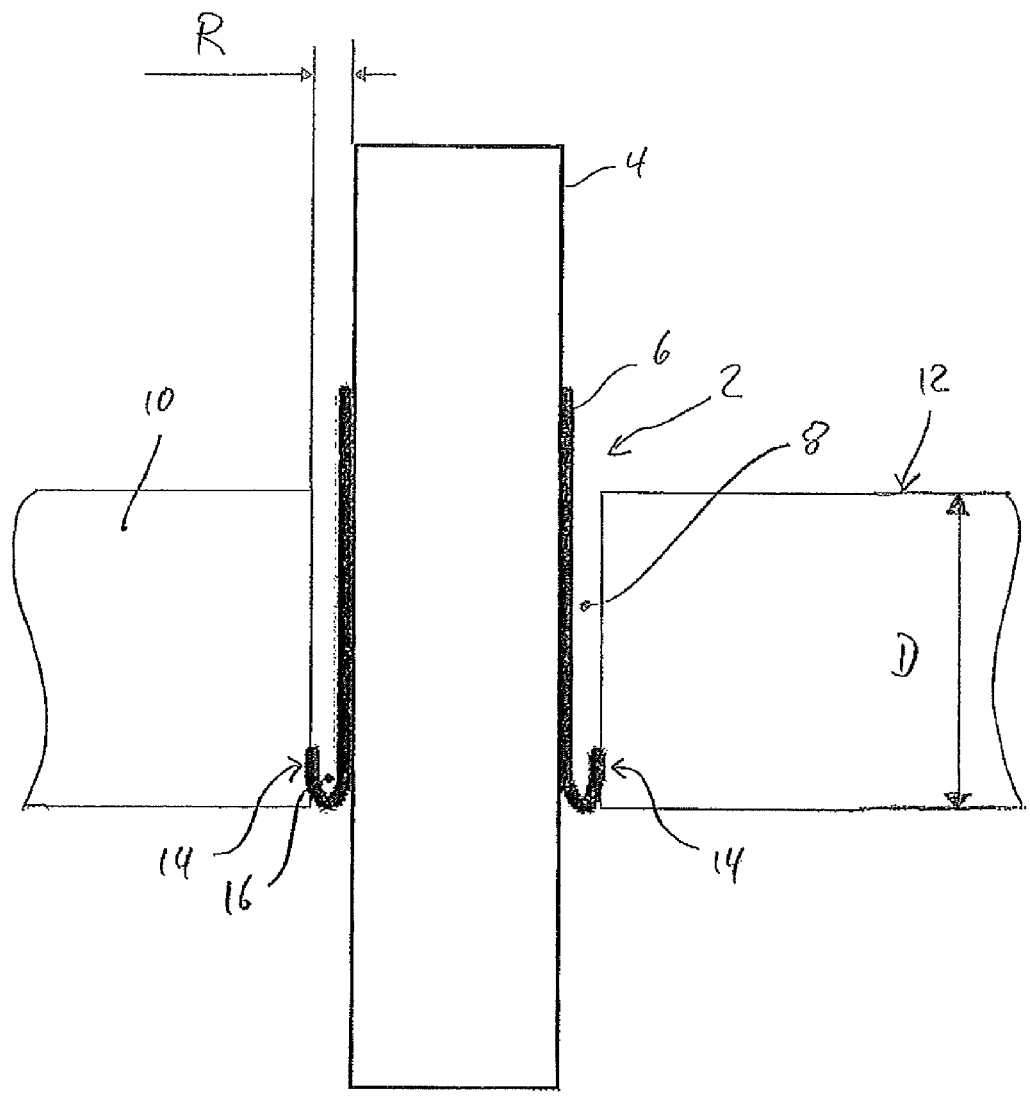
FIG. 1 is a simplified cross-section of a pipe guided through a ceiling passage, which is secured with a fire-prevention sleeve.

Fire-safe seals of ceiling passages can be installed from the top allowing for a lower expense and a better implementation. Some embodiments provide that, for this purpose, formwork is used, which to the extent possible is also installed from the top. If this option is not provided, then, for example, classic wood formwork is used, which can be installed from the bottom of the ceiling passage. Particularly permanent formwork is suitable for an installation from the top, which remains in the passage after its sealing. For this purpose, mineral wool or construction foam, for example, can be used.

For a fire-technical safeguarding of installations using materials that are not fire-proof, which is guided through the ceiling passage, materials are used that seal the ceiling passage in case of a fire. This may be achieved by using particular fire-prevention additives, which develop intumescence, for example, under the influence of heat, such as in a fire. Permanent formwork produced from mineral wool might have disadvantages due to the insulating features of the mineral wool such that it also insulates intumescent material located behind the mineral wool from the heat of a fire. Consequently, this material might react after a delay. A flammable permanent formwork, for example, including construction foam might be more suitable; however, it requires a particular assembly space in the ceiling passage so that the materials including fire-prevention additives are located very deep inside the opening and thus perhaps in an instable fashion.

An objective of an embodiment can include, for example, to provide an improved fire-prevention sleeve and ceiling passage and an improved method for installing a fire-prevention sleeve, with some of the disadvantages of prior art being overcome.

According to an embodiment, a fire-prevention sleeve is provided, including a fire-prevention additive and embodied as a rectangular strip. This rectangular strip may be provided with a plurality of notches along only one of its longitudinal sides, so that neighboring flaps are formed. Advantageously, the notches can be embodied perpendicularly with respect to a longitudinal direction of extension of the rectangular strip. The flaps can develop oriented perpendicularly with respect to the longitudinal direction of extension and neighboring in this direction.

Advantageously, such a fire-prevention sleeve can be placed around an installation guided through the ceiling passage, for example, around a plastic pipe or around a cable conduit. The flaps present along its longitudinal sides may be bent perpendicular with respect to the direction of extension of the installation. When a fire-prevention sleeve prepared in this fashion is inserted in the annular gap between the installation and the ceiling passage the flaps are bent backwards to the fire-prevention sleeve and a pocket develops which seals the annular gap at its bottom. Advantageously, this pocket can serve as the permanent formwork for an insulation material to be filled into the annular gap. Self-leveling sealing materials can be used as the insulation material for sealing the ceiling. Advantageously, the installation of the fire-prevention sleeve can occur exclusively from the top. This allows for a lower assembly expense. Additionally, the intumescent material of the fire-prevention sleeve is placed in the area near the bottom of the ceiling passage by the pocket formed by the flaps of the fire-prevention sleeve and thus in proximity of the entry of the ceiling passage so that it can react quickly. In some embodiments, the fire-prevention sleeve is very flexible. It can be configured to different thicknesses of ceilings, sizes of openings and/or passages, sizes of pipes, etc.

Beneficially, the fire-prevention sleeve at least partially is made from a base material, which includes a matrix material and fire-prevention additives embedded therein. Here, the matrix material serves as a binder for the fire-prevention additive. A polymer can be used as the matrix material, for example. Advantageously, the portion of fire-prevention additives in the base material can range from amounts of 10% to 90% by weight, preferably from 50% to 90% by weight with respect to the base material. Accordingly, the portion of the matrix material ranges from 90% to 10% by weight, preferably from 50% to 10% by weight with respect to the base material. This ratio ensures the fire-preventive features of the fire-prevention sleeve by a sufficient amount of fire-prevention additives being provided causing sufficient intumescence for sealing the ceiling passage. The fire-prevention sleeve can be adjusted for the respective application. The fire-prevention sleeve may be entirely made from the base material, for example. The polymer used as the matrix material is preferably elastic, allowing for the fire-prevention sleeve to be equipped with mechanical features (e.g., required mechanical features) even without any carrier belt or any inserts.

Preferably, such fire-prevention additives are used that, by the formation of an expanded, isolating layer, developing under the influence of heat form a fire-retardant material (e.g., intumescent layer), seal the ceiling passage and thus prevent flames from spreading or at least delaying it. Such systems are known to one skilled in the art and can be used according to an embodiment of the present invention.

For the formation of an intumescent layer using a chemical process generally three components are used, a supplier of carbon, a dehydration catalyst, and a propellant. Upon the influence of heat, the binder and the fire-prevention additives are released. Acid is released from the dehydration catalyst through thermal disintegration, removing water from the carbon supplier and/or the binder, which leads to their charring (e.g., carbonization) and the formation of a carbon structure (e.g., the ash crust). Simultaneously, the propellant thermally disintegrates under the formation of non-flammable gases, which cause a foaming of the carbonized (e.g., charred) material under the formation of isolating foam. Due to the fact that the ash crust, forming from the binder in case of a fire, is generally too instable and, depending on its thickness and structure, may be blown apart by air flow, for example, which has negative consequences for the isolating effect of the coating, a component is added to the above-mentioned substances which can stabilize the ash crust formed by the binder or itself forms a framework upholding or reinforcing the isolating effect of the coating.

The compounds used as dehydration catalysts and/or acid formers in intumescent flame-retardants commonly used and known to one skilled in the art, such as salt or an ester of an inorganic, non-volatile acid selected from sulfuric acid, phosphoric acid, or boric acid may be used. A wide range of phosphoric compounds can be used because it extends over several oxidation levels of phosphorus, such as phosphine, phosphinoxide, phosphonium compounds, phosphates, elementary red phosphorus, phosphite, and phosphate. Examples of phosphoric acid compounds can include, for example, mono-ammonium phosphate, diammonium phosphate, ammonium phosphate, ammonium polyphosphate, melamine phosphate, melamine-resin phosphate, potassium phosphate, polyol phosphate, such as pentaerythritol phosphate, glycerin phosphate, sorbite phosphate, mannitol phosphate, dulcitol phosphate, neopentyl glycol phosphate, ethylene glycol phosphate, dipentaerithritol phosphate, and the like. A polyphosphate or an ammonium polyphosphate can be used as the phosphoric acid compounds. Melamine resin phosphates are understood as compounds, such as conversion products from lamelite C (e.g., melamine-formaldehyde resin) with phosphoric acid. Sulphuric acid compounds can include, for example, ammonium sulfate, ammonium sulfamate, nitroaniline bisulfate, 4-nitroaniline-2-sulfonic acid, and 4,4-dinitro-sulfanilamide, and the like. Melamine borate can be used as an example of a boric acid compound.

The compounds commonly used in intumescent flame-retardants and known to one skilled in the art can be used as carbon suppliers, such as starch-like compounds, e.g., starch and modified starch, and/or polyvalent alcohols (polyols), such as saccharides and polysaccharides, and/or a thermoplastic or duroplastic polymer resin binder, such as a phenol resin, a urea resin, a polyurethane, polyvinylchloride, poly (meth)acrylate, polyvinyl acetate, polyvinyl alcohol, a silicon resin, and/or a rubber. Suitable polyols can be polyols from the groups sugar, pentaerythritol, diphentaerythritol, polyvinyl acetate, polyvinyl alcohol, soritol, ethyleneoxide-propyleneoxide-polyols. Pentaertyritol, dipentaerythritol, or polyvinyl acetate.

The matrix material itself can also perform the function of a carbon source in case of a fire.

The propellants commonly used in flame-retardants and known to one skilled in the art may be considered, such as cyanuric acid or isocyanuric acid and their derivatives, melamine and its derivatives. They include, for example, cyanamide, dicyanamide, dicandiamide, guanidine and its salts, biguanide, melamin cyanurate, cyanuric acid salts, cyanuric acid esters and amides, hexamethoxy methyl melamin, dimelamin pyrophosphate, melamin polyphosphate, melamin phosphate. Preferably used are hexamethoxy methyl melamin or melamin (cyanuric acid amide).

Components with their effectiveness not being limited to a single function are also suitable, such as melanin polyphosphates, both as acid formers as well as propellants. Other examples are described in GB 2 007 689 A1, EP 139 401 A1 and U.S. Pat. No. 3,969,291 A1.

Additionally, compounds may be included which independently act intumescent under heat without any influence and/or reaction with other compounds, such as expanded graphite, vermiculite (e.g., expanded mica), and the like.

The compounds commonly used in flame-retardants and known to one skilled in the art can be considered as ash crust stabilizers and/or framework formers, for example, expanded graphite and particulate metals, such as aluminum, magnesium, iron, and zinc. The particulate metal may be present in the form of a powder, as platelets, scales, fibers, threads, and/or whiskers, with the particulate metal in the form of powder, platelets or scales showing a particle size of $\leq 50$ µm, preferably from 0.5 µm to 10 µm. In case of the use of the particulate metal in the form of fibers, threads, and/or whiskers a thickness is preferred from 0.5 µm to 10 µm and a length from 10 µm to 50 µm. Alternatively or additionally, an oxide or a compound of a group including metals including aluminum, magnesium, iron, or zinc can be used, particularly iron oxide, preferably iron trioxide, titanium dioxide, a borate, such as zinc borate and/or a glass frit from low-melting glasses with a melting temperature preferably at or above 400° C. The addition of such an ash crust stabilizer contributes to a stabilization of the intumescent crust in case of a fire, because these additives increase the mechanic stability of the intumescent layer and/or prevent their dripping. Examples of such additive are also found in U.S. Pat. No. 4,442,157 A, U.S. Pat. No. 3,562,197 A, GB 755 551 A and EP 138 546 A1.

In addition, ash crust stabilizers such as melamin phosphate or melamin borate and ablative compounds may be included, e.g., those disintegrating endothermally, such as compounds containing crystallization water, e.g., aluminum trihydroxide.

In an embodiment of the present invention, the fire-prevention sleeve includes, in addition to the base material, a carrier belt. This may be flexible so that the fire-prevention sleeve obtains from this carrier belt not only a certain degree of stability, but also simultaneously some elasticity. Advantageously, the size of the carrier belt is selected identical to the rectangular strip. The flaps of such a fire-prevention sleeve spread in the ceiling passage when the fire-prevention sleeve is inserted into the annular gap from the top and reliably form a pocket. Beneficially the fire-prevention sleeve with the carrier belt includes base material by at least 30%, preferably up to 75%. Thus, with the use of a carrier belt, a sufficiently large volume of intumescent can be ensured, sealing the ceiling passage in case of a fire.

In an embodiment, the carrier belt is coated at one side or at both sides with the base material. In the latter case, the carrier belt is therefore embedded in the base material as an insert. The advantageously flexible carrier belt includes, for example, a web, fleece, and/or sheet metal. Wire-reinforced webs or fleeces may also be used as the carrier belt. Fleece is additionally advantageous in that the fire-prevention sleeve simultaneously causes a decoupling of structure-borne sounds. To improve this effect, the fire-prevention sleeve and/or its carrier belt can additionally be provided with a compressible layer that is, for example, made from foam rubber.

The notches inserted in the rectangular strips can preferably be distanced from each other from 2 mm to 30 mm in the direction of the longitudinal extension of the fire-prevention sleeve. Such a distance has proven to be a good compromise between flexibility and stability of the flaps of the fire-prevention sleeve.

In an embodiment, the fire-prevention sleeve is used as the permanent formwork for a ceiling passage. An additional formwork can be waived, which leads to reduced assembly expenses and cost benefits.

In an embodiment, a ceiling passage is provided with an opening, through which a pipe extends in the vertical direction. The pipe may be surrounded by a fire-prevention sleeve. The bottom edge of the fire-prevention sleeve may be provided with several flaps bent backwards, which are supported on the wall of the opening. An additional fire-prevention material may be provided in a space between the fire-prevention sleeve and the wall of the opening. Additionally, a sealing material may be arranged between the flaps and the fire prevention sleeve. Many of the same or similar above-mentioned advantages with respect to the fire-prevention sleeve also apply to the above-mentioned ceiling passage.

In an embodiment, the ceiling passage includes a fire-prevention sleeve, with its width being greater than the vertical length of the opening. Thus, the fire-prevention sleeve extends along the entire length of the opening and the opening is reliably secured with respect to fire-prevention.

Additionally, the length of the flaps measured perpendicular with respect to the direction of the longitudinal extension of the fire-prevention sleeve may be greater than the width of an annular gap existing between the exterior or the pipe and the interior of the opening. This dimension of the flaps ensures that during the insertion of the fire-prevention sleeve into the annular gap they bend backwards in the direction of the fire-prevention sleeve and this way a pocket forms, which can be used as the permanent formwork.

In an embodiment, a method is provided to install a fire-prevention sleeve in the ceiling passage of a pipe. This fire-prevention sleeve can be arranged around the pipe and above the ceiling. An edge of the fire-prevention sleeve facing the ceiling may be provided with several flaps. The fire-prevention sleeve is arranged around the pipe such that its flaps point in the direction of the passage through which the pipe is guided. The flaps of the fire-prevention sleeve can be bent perpendicularly with respect to the direction of extension of the pipe. Finally, the fire-prevention sleeve can be inserted into an annular gap in the ceiling between a wall of the opening and an exterior of the pipe, by which the flaps of the fire-prevention sleeve are bent backwards. A pocket forms is thus formed inside the opening, into which a sealing material can be inserted. For this purpose, common filler materials, such as mortar, gypsum, fire-prevention foam, or mineral wool can be used.

FIG. 1 shows a simplified cross-section, which illustrates an embodiment of a pipe 4 guided through a ceiling passage 2. As an alternative embodiment to the illustrated pipe 4, a line, a cable conduit, or another supply line using flammable materials may be guided through the ceiling passage 2. For a technical fire-proofing, a fire-prevention sleeve 6 is located in an annular gap 8, extending between an exterior of the pipe 4 and an interior of a passage 2 present in a ceiling 10. The fire-prevention sleeve 6 is band-shaped and placed at least once around the pipe 4. The fire-prevention sleeve 6 includes common fire-prevention additives known to one skilled in the art, for example, materials expanding under the effects of heat, such as expanding graphite, acid formers, such as ammonium polyphosphate, carbon sources, such as sugar polyol (e.g., pentaerythritol), gas formers (e.g., propellants), such as cyanuric acid derivatives, and ablatives, e.g., endothermally disintegrating compounds, such as aluminum trihydroxide. In order to provide technical fire-proofing of the passage 2 an appropriately large volume of intumescent must be provided. For example, the fire-prevention sleeve 6 can be placed around the pipe 4 several times. The number of windings can be adjusted to the special application, in which the diameter of the pipe, the material of the pipe, a radial extension R of the annular gap 8, the ceiling thickness D, and/or the positioning of the fire-prevention sleeve 6 can be considered.

The fire-prevention sleeve 6 is inserted from the top 12 of the ceiling 10 into the annular gap 8. Flaps 14 provided in the lower section of the fire-prevention sleeve 6 are bent in the direction of the fire-prevention sleeve 6 so that a pocket 16 forms in the lower part of the annular gap 8. The fire-prevention sleeve 6 can simultaneously serve as the formwork (e.g., permanent formwork) for a sealing material (e.g., a mortar capable of flowing) to be inserted from the top 12 of the ceiling 10 into the annular gap 8.

Figure 2:
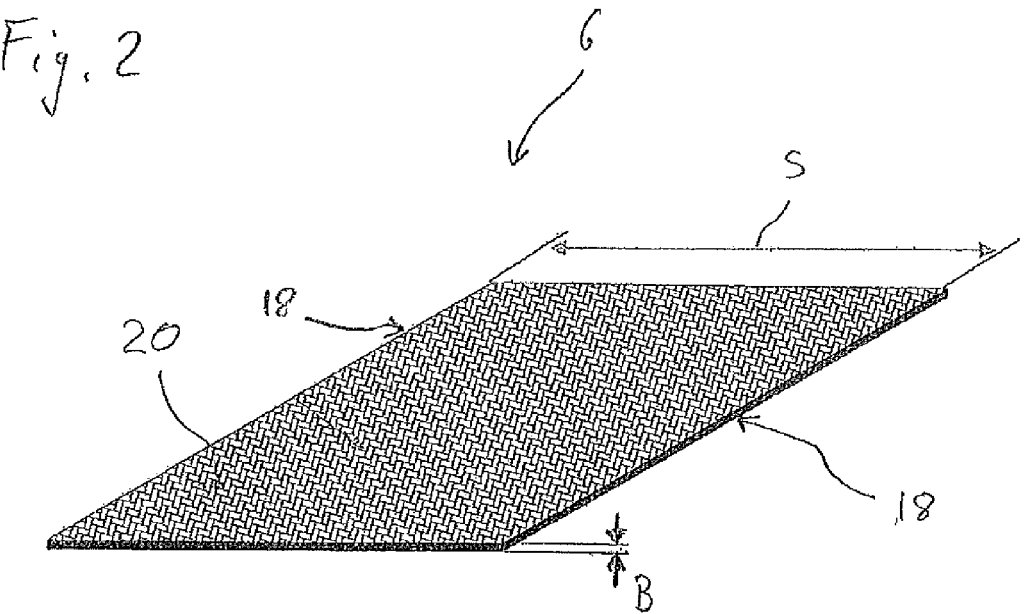
FIG. 2 is a simplified perspective view of a fire-prevention sleeve prior to the insertion of the notches.

FIG. 2 shows a simplified perspective illustration of an embodiment of a fire-prevention sleeve 6 before notches are inserted along one of its longitudinal sides 18. The fire-prevention sleeve 6 is made from a base material, which includes a matrix material and fire-prevention additives embedded therein. The base material may be a polymer, such as polyurethane, acrylate, silicon, EPDM, etc. The fire-prevention additives may be fire-prevention additives known to one skilled in the art. The base material of the fire-prevention sleeve 6 is reinforced with a carrier belt 20, which is shown in FIG. 2 as a structured surface. This carrier belt 20 can be flexible and can include one or more of the following: a web, a wire-reinforced web, a fleece, and a sheet metal (e.g., a flexible sheet metal). The carrier belt 20 reinforces the fire-prevention sleeve 6 so that the flaps 14 reliably clamp in the annular gap 8 (see also, e.g., FIG. 1). Additionally the carrier belt 20 may or may not be flammable. If a non-flammable web layer is used as the carrier belt 20, for example, then an improved ash crust stability can positively influence the behavior of the fire-prevention sleeve 6.

In an embodiment, the use of a carrier belt 20 is not necessary for a fire-prevention sleeve 6. It may include (e.g., exclusively include) a base material, e.g., a polymer or a polymer mixture with fire-prevention additives embedded therein. In the assembled state of the fire-prevention sleeve 6, the carrier belt 20 used to support the base material may be arranged facing the pipe 4 or facing away therefrom. Another option includes to coat the carrier belt 20 on both sides with the base material so that the carrier belt 20 is embedded in the base material. To ensure a problem-free bending of the fire-prevention sleeve 6, its overall thickness B should not exceed 5 mm. The width S of the fire-prevention sleeve 6 can be adjusted to the thickness D of the ceiling 10, in which the passage 2 is located. The pipe 4 can be secured along the entire length of the passage 2. The width S can be designed such that sufficiently long flaps 14 are provided to form the pocket 16 (see also, e.g., FIG. 1).

To achieve the desired volume of intumescent, the fire-prevention sleeve 6 can overwhelmingly be made from the base material, and the carrier belt 20 can play (e.g., can only play) a secondary role. Empiric examinations have shown that it is useful for the base material to assume at least 30% and preferably 75% of the fire-prevention sleeve 6.

Figure 3:
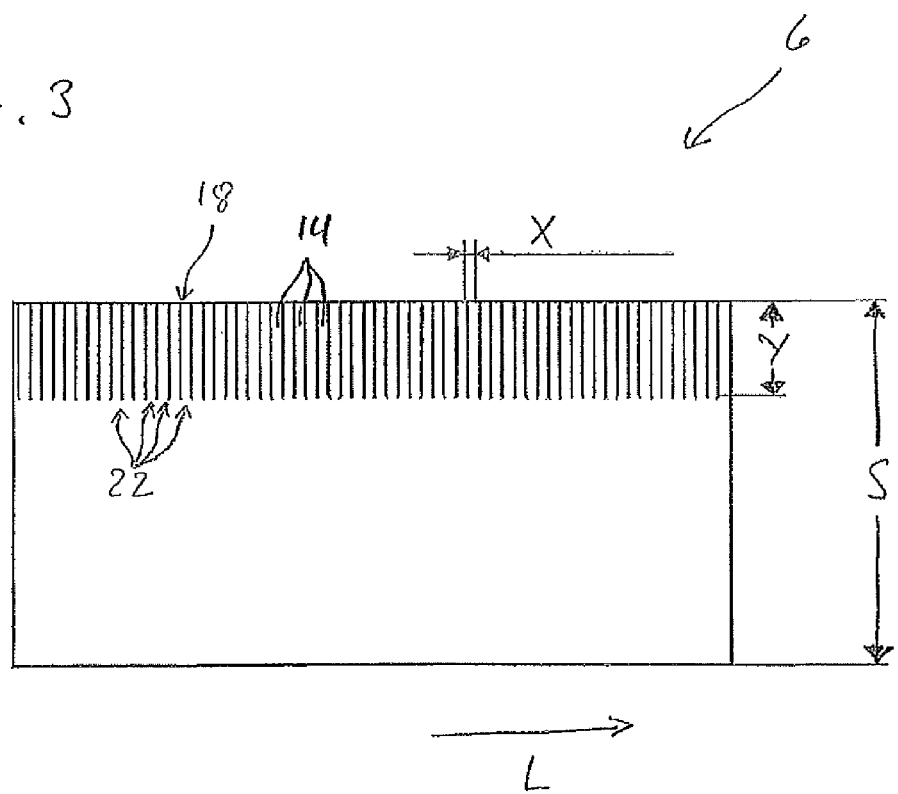
FIG. 3 is a fire-prevention sleeve according to an exemplary embodiment shown from the top.

FIG. 3 shows another embodiment of the fire-prevention sleeve 6. In this fire-prevention sleeve 6, the notches 22 are already inserted in one longitudinal side 18. The notches 22 are distanced from each other by a cutting distance X in a direction L of the longitudinal extension of the fire-prevention sleeve 6. In some embodiments, the cutting distance X ranges from 2 mm to 30 mm. It determines the width of the flaps 14 developing between the notches 22. The above-mentioned cutting distance X has proven to be a good compromise to yield both stable as well as flexible flaps 14. While the width S of the fire-prevention sleeve 6 is determined by the thickness D of the ceiling 10, the depth Y of the notches 22 is determined by the radial width R of the annular gap 8. In some embodiments, the depth Y of the notches 22 is designed to be greater than the radial width R of the annular gap 8 so that the flaps 14 bend over the desired pockets 16 that form at the bottom end of the passage (see also, e.g., FIG. 1).

Depending on the application the following dimensions of the fire-prevention sleeve 6 have proven useful:

| Type of pipe | Diameter of pipe up to max. [mm] | Annular gap R up to max. [mm] | Width of belt S [mm] | Thickness of belt B [mm] | Volume of intumescent under load x-fold | Windings Number |
|---|---|---|---|---|---|---|
| Metal pipes | 400 | 100 | 300 | 2 | 10 | >2 |
| Plastic pipes | 160 | 50 | 250 | 4 | 10 | 2-4 |

Figure 4:
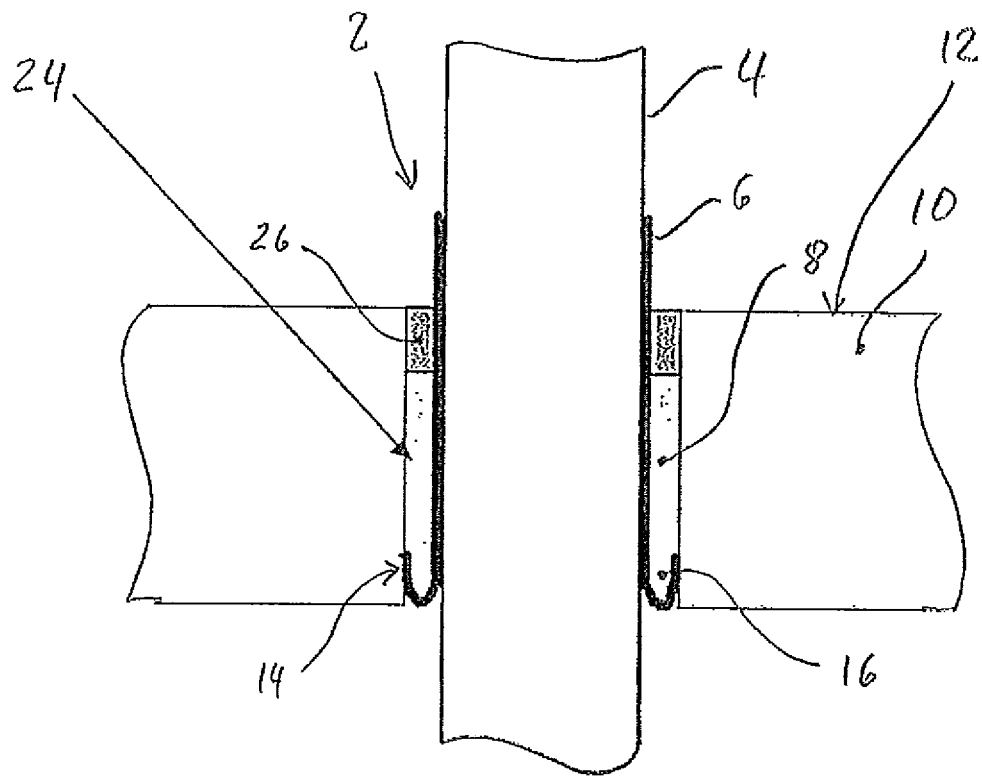
FIG. 4 is another simplified cross-section of a pipe guided through a ceiling passage after the implementation of a ceiling seal.

FIG. 4 shows a simplified cross-section of another embodiment of a pipe 4, which is secured via a fire-prevention sleeve 6 and is guided through a passage 2 present in a ceiling 10. The flaps 14 of the fire-prevention sleeve 6 have spread in the passage 2 and form a pocket 16. In order to seal the passage 2 a filler material 24 is filled into the annular gap 8, in the exemplary embodiment shown it represents mineral wool. The passage 2 is additionally sealed with a sealant 26 in the area of the surface 12 of the ceiling 10. This may represent, for example, a self-leveling sealant, such as mortar or gypsum that is capable of flowing.

To create sound-proofing between the pipe 4 and the ceiling 10, the fire-prevention sleeve 6 may at least be provided with a compressible layer (e.g., foam rubber) at one of its two flat sides. For reasons of a simple production, it is useful to provide the carrier belt 20 of the fire-prevention sleeve 6 with such a compressible layer on the flat side facing away from the base material.

In one embodiment, the fire-prevention sleeve 6 allows for a simple installation from the top 12 of the ceiling 10 and provides for a quick and cost-effective installation. By combining a formwork (e.g., a permanent formwork) and the fire-prevention sleeve 6, an additional formwork can be waived, which allows for an economical installation. Due to the concentrated positioning of the fire-preventing additives in the fire-prevention sleeve 6, a reliable and secure seal can be ensured, particularly at the bottom of the passage 2. The fire-prevention sleeve 6 can be provided as a continuous tape material and thus used flexibly for various pipes 4 of different diameters. Additionally, in case of a sufficiently wide roll S of the fire-prevention sleeve 6, the side facing away from the fire can be isolated in one step for metal pipes or cable conduits.

While particular elements, embodiments, and applications of the present invention have been shown and described, it is understood that the present invention is not limited thereto because modifications may be made by those skilled in the art, particularly in light of the foregoing teaching. It is therefore contemplated by the appended claims to cover such modifications and incorporate those features which come within the spirit and scope of the present invention.

The invention claimed is:

1. A fire-prevention sleeve installation, comprising:
   a pipe that extends vertically through an opening in a ceiling and forms an annular gap between the pipe and an inner wall of the opening; and
   a fire-prevention sleeve around the pipe and in the annular gap between the pipe and the inner wall;
   wherein the fire-prevention sleeve comprises a strip of intumescent material comprising:
      a first surface contacting the pipe;
      an opposite second surface facing the inner wall; and
      a plurality of notches that are along and through a lower section of the fire prevention sleeve and that form a plurality of flaps; and
   wherein the plurality of flaps are bent upward, engage the inner wall of the opening, and form, with the second surface of the strip, a pocket between the inner wall and the pipe.

2. The fire-prevention sleeve installation according to claim 1, wherein the fire-prevention sleeve further comprises a carrier belt.

3. The fire-prevention sleeve installation according to claim 1, wherein the fire-prevention sleeve is at least partially made from a base material that includes a matrix material and a fire-prevention additive embedded in the matrix material.

4. The fire-prevention sleeve installation according to claim 3, wherein the fire-prevention additives amount from 10% to 90% by weight of the base material.

5. The fire-prevention sleeve installation according to claim 3, wherein the base material amounts to at least 30% by weight of the fire prevention sleeve.

6. The fire-prevention sleeve installation according to claim 3, wherein the fire-prevention sleeve further comprises a carrier belt that is coated with the base material.

7. The fire-prevention sleeve installation according to claim 6, wherein the carrier belt includes a flexible material.

8. The fire-prevention sleeve installation according to claim 7, wherein the carrier belt includes a web or a sheet metal.

9. The fire-prevention sleeve installation of claim 1, wherein successive notches of the plurality of notches are separated by 2 mm to 30 mm.

10. The fire-prevention sleeve installation according to claim 1, wherein the fire-prevention sleeve provides a permanent formwork for the opening in the ceiling.

11. A fire prevention sleeve surrounding a pipe which extends vertically through an opening in a ceiling, the fire-prevention sleeve comprising:
    a strip of intumescent material, wherein a plurality of notches are provided along a lower edge of the strip that is proximate a lower end of the opening, wherein the plurality of notches form a plurality of flaps along the lower edge of the strip, and wherein the plurality of flaps are bent upwards and into contact with an inner wall of the opening proximate the lower end of the opening.

12. The fire-prevention sleeve according to claim 11, wherein fire-prevention material is arranged between the fire-prevention sleeve and the inner wall of the opening.

13. The fire-prevention sleeve according to claim 12, wherein a sealant is provided between the fire-prevention sleeve and the inner wall of the opening.

14. The fire-prevention sleeve according to claim 11, wherein the fire-prevention sleeve has a width greater than a vertical length of the opening.

15. The fire-prevention sleeve according to claim 11, wherein the plurality of flaps of the fire-prevention sleeve have a length measured perpendicular with respect to a direction of a longitudinal extension which is greater than a width of an annular gap between an exterior of the pipe and the inner wall of the opening.

16. A method for installing a fire-prevention sleeve in a ceiling passage of a ceiling in which a pipe is located, comprising:
    arranging a fire-prevention sleeve around the pipe from above the ceiling; and
    forming a plurality of flaps on a bottom edge of the fire-prevention sleeve, the bottom edge of the sleeve facing the ceiling,
    bending the plurality of flaps such that the plurality of flaps extend radially away from the pipe; and
    inserting the fire-prevention sleeve into an annular gap between the pipe and an inner wall of the ceiling passage such that the plurality of flaps engage the inner wall causing the plurality of flaps to bend upward toward an upper edge of the fire-prevention sleeve.

17. The method according to claim 16, comprising:
    filling a pocket, formed by the bent plurality of flaps and an external surface of the fire-prevention sleeve running along the pipe, with insulation material.

18. A method according to claim 16, comprising:
    filling a space between the fire-prevention sleeve and the inner wall of the ceiling passage with a sealant.

* * * * *